Patented Dec. 16, 1924.

1,519,204

UNITED STATES PATENT OFFICE.

KARL HESS, OF HEILBRONN, GERMANY.

PROCESS FOR THE REGAINING OF METAL FROM METALLIC CHIPPINGS.

No Drawing.   Application filed December 6, 1920.   Serial No. 428,806.

*To all whom it may concern:*

Be it known that I, KARL HESS, a citizen of the German Republic, residing at Heilbronn a. N., Wurttemberg, Germany, have invented certain new and useful Improvements in Processes for the Regaining of Metal from Metallic Chippings (for which I filed applications in Germany, April 3, 1918, and July 29, 1918; Italy, Feb. 18, 1919; Switzerland, 1919; Belgium, Feb. 7, 1919; and France, Feb. 7, 1919), of which the following is a specification.

The present invention relates to a process for treating chippings or ashes of certain metals, by melting out light metals from the residues. The process is especially applicable to metals which have a great affinity for oxygen, notably aluminum and magnesium and alloys thereof such as magnalium, electrone and the like. If these metals are simply subjected in an open receptacle to a melting operation, without special precautions being taken, the yield will be very small. This also applies when salts capable of serving as fluxes are added, and the metal chippings simply melted in an open receptacle.

The process is carried into practice, by coating the chippings, etc., with a layer of a suitable salt, in order to prevent burning of the metal by the heating flame, and subsequently heating sufficiently to melt the metal. After a while a metal bath is produced, upon which coated metallic particles, coated chippings, ashes and the like will float about, for subsequent reduction with the salt into the form of a slag. During the skimming off of the slag, a considerable loss of metal is brought about.

In the present invention, fluxes are used, as well as compounds which have the property of dissolving oxidized metals of the character referred to. In the said process a special point of novelty is that the material being introduced is gradually introduced in small quantities into the molten salt bath, thereby the advantage is produced that the whole of the metal of the chippings, the whole of the oxidized metal (ash) and the whole of the residue are obtained, whereas in the prior processes, the yield was very much smaller. This increase in yield results from the gradual introduction of small quantities of metallic chippings into the bath, whereby the oxid coverings of the same are burst open and subsequently dissolved, while the pure metal is largely separated and taken up in the molten metal bath, while all metal oxids present combine gradually with the flux which is present in abundance. It is to be observed that the chippings and the like do not at any stage come into contact with the melting flame during the introduction of the same into the salt bath. In order to prevent this a special arrangement has been devised by me, in which the cover which carries the filling opening of the smelting furnace, is brought down low enough so that the same dips into the surface of the salt bath, completely around the filling opening, to prevent entry of the flame into the filling opening, when the salt bath has reached the normal working level in the furnace.

The process, however, does not produce perfect results, since the slag still contains a certain quantity of pure metal. After cooling, these small portions of subdivided metal are left in the block consisting of the solidified slag. These metal particles will not readily separate since the small bodies of metal do not have a substantial tendency to run together to produce a large body of metal, particularly on account of the small size of the same. Heretofore the quantity of such small particles of metal was lost. In order to avoid this, rock salt is used as a flux for the oxids. After the fluxing operation, the slag is dissolved in water, after hardening and preferably after crushing. The small particles of metal are thereby separated and the dissolved salt can be recovered, for instance by evaporating, while the metal parts can be melted together in a subsequent run of the smelting process, in which a new mixture of salt and flux is employed. The new process accordingly has the advantage that it not only renders possible the complete recovery of the metal, but also of the flux, so that the latter can be used again, except for immaterial mechanical losses.

I claim:

1. A process of recovering light metals from chippings, residues, ashes, etc. by melting the said material with salts, the said material being gradually introduced in small quantities into a bath of molten salt.

2. A process of regaining light metals from residues, ashes and the like, by introducing the said material gradually into a bath of fused sodium chloride, until the bath has absorbed a substantial amount of metal oxids, after which the slag is subjected to treatment with water for dissolving the same and the subsequent recovery of its constituents.

In testimony whereof I affix my signature in presence of two witnesses.

KARL HESS.

Witnesses:
 E. SCHLEICHER,
 FRIEDA KLAIBER.